Figure 12:
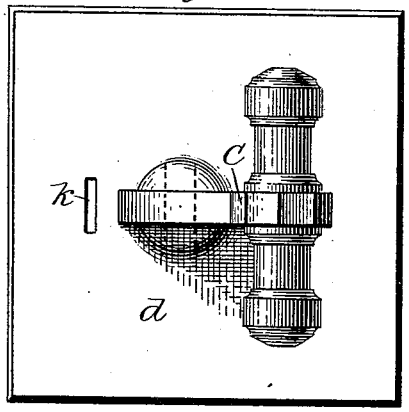

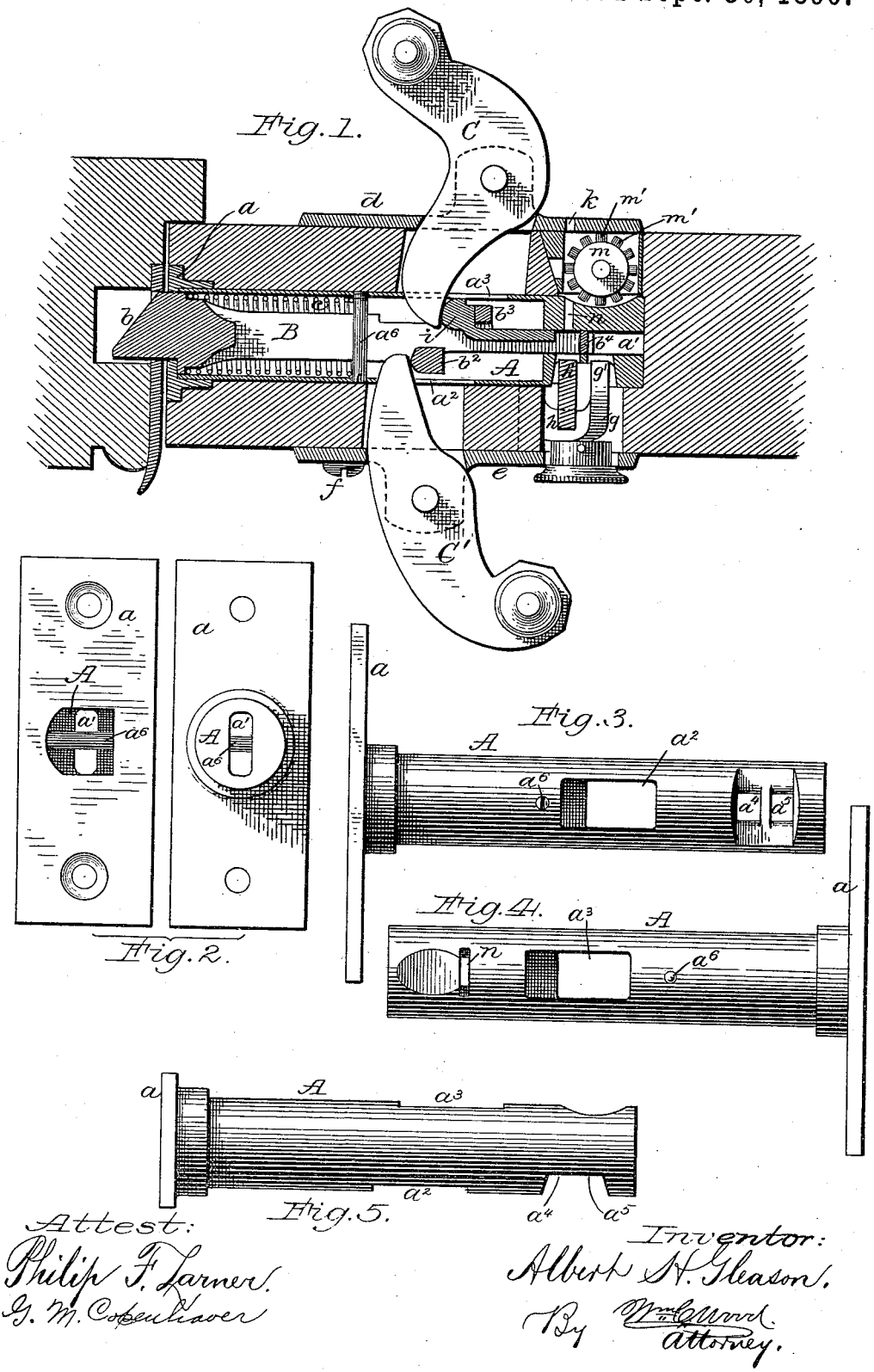

(Model.)
3 Sheets—Sheet 2.
A. H. GLEASON
LATCH.
No. 437,590.
Patented Sept. 30, 1890.
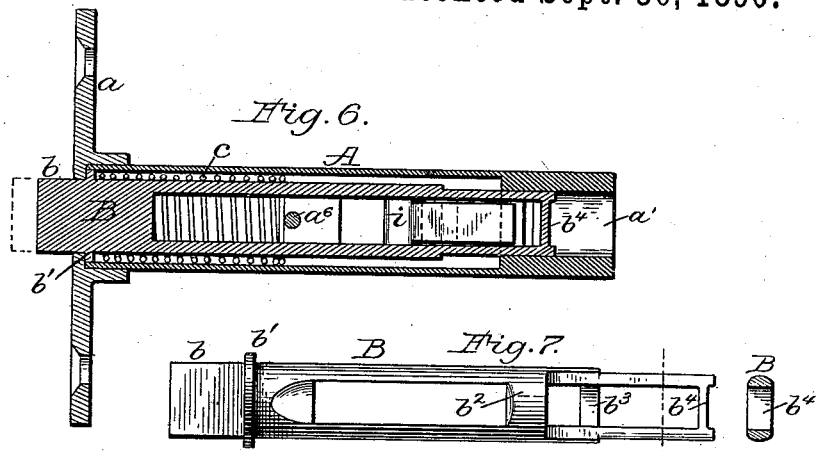
Fig. 6.
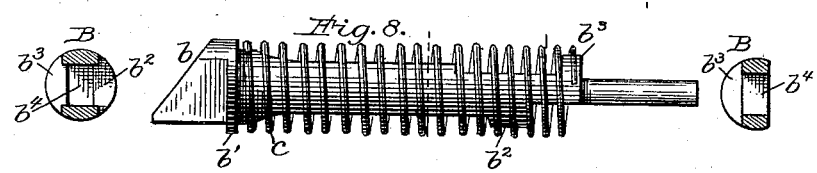
Fig. 7.
Fig. 8.
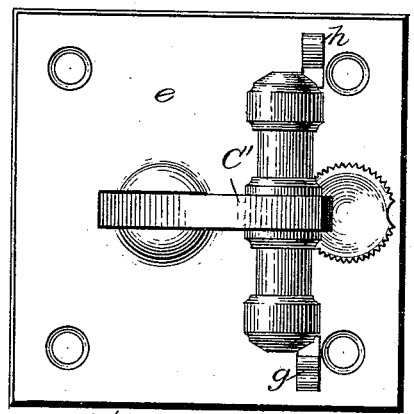
Fig. 9.
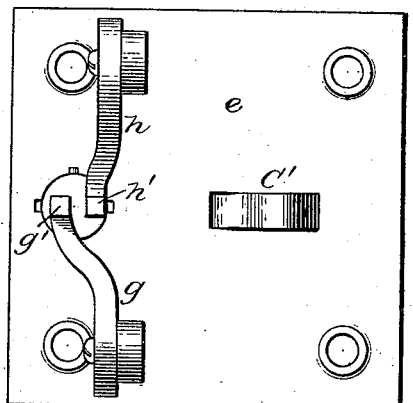
Fig. 10.
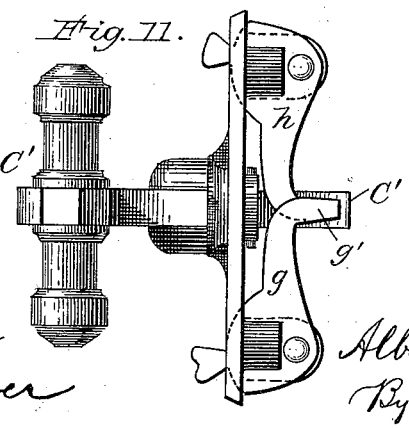
Fig. 11.
Attest:
Philip F. Larner.
G. M. Copelcaver.
Inventor:
Albert H. Gleason.
By Wm C. Wood
Attorney.

(Model.)

A. H. GLEASON.
LATCH.

No. 437,590.  Patented Sept. 30, 1890.

Attest:
Philip F. Larner.
G. M. Copenhaver.

Inventor:
Albert H. Gleason
By Wm Curwood
Attorney

UNITED STATES PATENT OFFICE.

ALBERT H. GLEASON, OF WARSAW, INDIANA.

LATCH.

SPECIFICATION forming part of Letters Patent No. 437,590, dated September 30, 1890.

Application filed July 1, 1889. Serial No. 316,197. (Model.)

*To all whom it may concern:*

Be it known that I, ALBERT H. GLEASON, of Warsaw, in the county of Kosciusko and State of Indiana, have invented certain new and useful Improvements in Latches; and I do hereby declare that the following specification, taken in connection with the drawings furnished and forming a part of the same, is a clear, true, and complete description of my invention.

My improvements relate to that general class of sliding spring-latches which are actuated by means of hand-levers as distinguished from knobs, whether on rotative spindles or on spindles which slide to and fro endwise.

After describing in detail the latches illustrated in the drawings, the features deemed novel will be duly specified in the several clauses of claim hereunto annexed.

Figure 13:
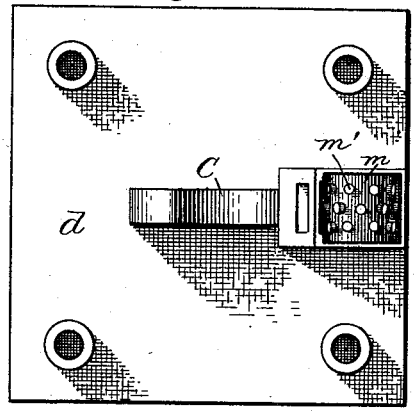
Figure 14:
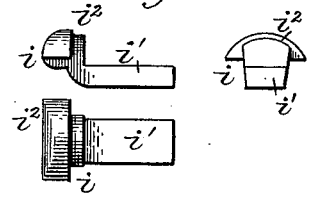
Figure 15:
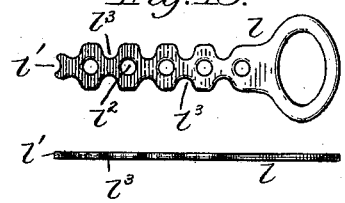
Figure 16:
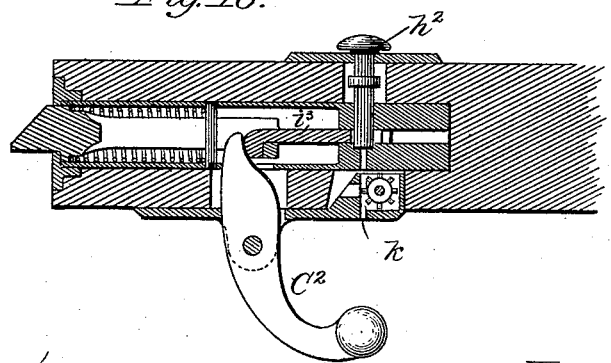

Figure 1 in longitudinal lateral section illustrates one of my latches having two handles or hand-levers as when mounted for service on a house-door. Figs. 2, 3, 4, and 5 illustrate the latch-case, respectively, in end views and two side views and top view. Fig. 6 is a longitudinal vertical section of the latch-bolt and its case. Figs. 7 and 8, in side and top views and also in several sections, illustrate the latch-bolt detached. Figs. 9, 10, and 11 illustrate the inner hand-lever, its plate, and two thumb-piece catches, one for controlling the outer or opposite hand-lever and the other for locking the latch-bolt. Figs. 12 and 13 illustrate the outer hand-lever, its escutcheon-plate, key-slot, and a rotative tumbler. Fig. 14 in several views illustrates a movable abutment-block carried in and by the latch-bolt, for locking the outer handle against vibration. Fig. 15 illustrates the night-latch key in side and edge views. Fig. 16 in longitudinal central section illustrates one of my latches as when applied to service on a cupboard or closet-door.

The latch-case A, Figs. 1 to 5, inclusive, may be widely varied in form, but is here shown to be cylindrical and provided with a face-plate $a$ of the usual form and constructed separately from the tubular portion of the case. The rear end of the case is provided with a central longitudinal slot $a'$, which serves as a guide for the rear end of the latch-bolt. At the two sides of the case there are longitudinal slots or openings $a^2$ and $a^3$, for the reception of the inner ends of latch-operating levers or handles, and at one side, near the rear end, there are two separate openings or holes $a^4$ and $a^5$ for receiving the locking-ends of thumb-catches, which respectively secure a "night-latch" adjustment, and positively confine or lock the latch-bolt against retraction.

At $a^6$ there is a diametric stud or pin, which serves as the rear abutment for a coiled latch-spring.

The sliding latch-bolt B (shown in Figs. 7 and 8) has the usual latch-head $b$ and a flange $b'$, which on its front side abuts against the inner surface of the face-plate $a$ for limiting the protruding movement of the latch, and the rear side of said flange serves as the front abutment of a latch-spring. The body of the latch-bolt is skeletonized, in that it is hollow or slotted from side to side, but has a front cross-bar $b^2$, a central cross-bar $b^3$, and a rear cross-bar $b^4$ at the extreme rear end of the bolt, which is formed into a thin straight tail-piece to freely slide in the guiding-slot $a'$ in rear end of the case.

In Fig. 8 the latch-spring $c$ is shown in place upon the latch and in its expanded condition, and when the bolt is within its case, as shown in Fig. 6, with the spring contracted and abutting at its ends, respectively, against the flange $b'$ on the bolt and the stud $a^6$ in the case it maintains the bolt in its operative position.

The latch-bolt is retracted by means of two hand-levers, which will be termed the "outer handle" C and the "inner handle" C'. These handles are curved levers centrally pivoted in lugs upon suitable escutcheon-plates $d$ and $e$. These two plates are independent of the latch-case, and are connected by four corner bolts or screws $f$, which occupy holes in suitable projecting bosses or sleeves on the inner sides of the plates.

I will first describe the plate $e$ and the inner handle C', which when in position engages at the rear side of its inner end with the front side of the front cross-bar $b^2$ of the latch-bolt, so that when said handle is pulled it will swing on its pivot and its inner end will act against the latch-bolt and retract it. It will be seen that this handle C' curves rearward or away from the latch-face, and it is to be understood that such a handle, so arranged and operating a sliding latch is not new. This escutcheon-plate $e$ also supports two pivoted thumb-catches $g$ and $h$. One of these—the catch $g$—positively locks the latch-bolt against retraction, its inner end at $g'$ entering the rear hole $a^5$ in the latch-case, and, crossing the path of the latch-bolt in the guiding-slot $a'$ in said case, serves as an abutment or stop against which the rear side of the cross-bar $b^4$ on the latch-bolt engages, thus preventing its movement until the catch has been swung outwardly into its normal position. The pivoted catch $h$ is similar to catch $g$, but its inner end $h'$ is located so that it can freely enter and leave the front hole $a^4$ in the lock-case, and when entered it occupies space within the bolt and serves to lock the outer handle C against vibration, and in so doing renders said handle inoperative for retracting the latch-bolt. This catch $h$ in no manner affects the free retraction of the bolt, as by the inner handle C' or automatically, as in the act of closing a door, because the said inner end $h'$ occupies a free space or slot within the bolt.

Between the inner end $h'$ of the thumb-catch and the inner end of the handle C a movable abutment-block $i$ is interposed. This block has a tail-piece at $i'$ and a head at $i^2$, and it is carried in and by the latch-bolt at its rear end in such a manner that the rear side of the head can abut against the front side of the cross-bar $b^3$ of the bolt, and the rear end of the tail-piece can abut against the front side of the inner end $h'$ of the thumb-catch $h$ when the latter is adjusted for night-latch service. The inner end of the handle C engages with the front side of the head $i^2$, and when said block $i$ is free to move with the latch-bolt the outer handle operates in retracting the bolt just the same as if it should engage directly with the cross-bar $b^3$; but when the thumb-catch $h$ is set for service said block cannot move at all, and therefore the outer handle cannot be vibrated; but the latch-bolt can freely move rearward, because neither the block $i$ nor the thumb-catch $h$ directly operate thereon, and they only affect the bolts by permitting or preventing the outer handle from influencing it in any manner.

For enabling the outer handle C to become operative it is only necessary to throw the inner end $h'$ of the thumb-catch $h$ backward into its normal position, and this is done at the outer side of a door by the insertion of a key, which is thrust through a slot $k$ in the outer escutcheon-plate, thus enabling the block $i$ to move rearward with the bolt. The character of the thrusting-key may of course be widely varied, and so may such safeguards as will be readily suggested to persons skilled in locks. As here shown, the key $l$ has an end or tip $l'$, which abuts against the end $h'$ of the thumb-catch, and for safeguards it is provided with a series of central holes $l^2$ and two series of edge notches $l^3$, the notches and holes alternating with each other as to position. With such a key a rotative tumbler $m$ is employed on the inner side of the escutcheon-plate $d$. This tumbler has on its periphery three rows of slightly-projecting studs or pins $m'$, the axis of the tumbler being vertical and parallel with the key-slot $n$, so that said pins extend laterally across said key-slot during the rotation of the tumbler, and they always so obstruct said slot that nothing can be thrust therein which cannot register with said pins. When the key $l$ is inserted, the notch at its tip engages with the one central pin then in position near the entrance to the slot, and the other pins as the tumbler is revolved by the key progressively occupy their respective holes $l^2$ and recesses $l^3$, thus freely permitting the key to be entered and thrust endwise against the thumb-catch at $h'$ and to release the block $i$ and the outer handle C. After thus opening a door from the outside, the catch requires to be again set at the inner side by hand, as before.

The employment of the abutment-block co-operating with a thumb-catch and controlled by a key is not restricted to a latch having the two handles—as, for instance, as shown in Fig. 16, in a latch adapted to use on doors of closets, cupboards, &c. In this instance the thumb-catch $h^2$ is a sliding stud, which when retracted leaves the latch-bolt free to be moved by the handle $C^2$, but when the thumb-catch is forced inward its inner end occupies the path of the abutment-block $i^3$ and prevents the movement of the handle and bolt until after a key has been inserted at the slot $k$ and the thumb-catch forced backward.

Having thus described my invention, I claim as new and desire to secure by Letters Patent—

1. The combination, substantially as hereinbefore described, of a sliding latch-bolt and its spring, a curved lever or handle centrally pivoted engaging the latch-bolt at one side thereof and at its outer end projecting away from the head of the bolt and a second curved and centrally-pivoted lever or handle at the opposite side of the latch-bolt, its inner end engaging with said bolt and its outer end projecting toward the head of the latch, whereby the latch-bolt may be retracted by a pull upon the first handle or by a push against the second, the force in either case being applied according to the direction in which a closed door would swing in opening.

2. The combination, substantially as hereinbefore described, of a sliding latch-bolt and its spring, a pivoted handle or lever for retracting the bolt and extending at right angles from one side thereof, a movable abutment-block for confining the handle against movement, a thumb-catch adjustable toward and from the rear end of said block, externally accessible at the side of the latch opposite said handle and internally accessible by way of a key-slot near the handle to the thrusting action of a key for displacing the catch from the path of the block and thereby releasing the lever or handle.

3. The combination, substantially as hereinbefore described, of a sliding latch and its spring, a handle or lever for retracting the bolt, a movable abutment-block for confining the handle against movement, a thumb-catch which confines or releases said block, and a rotative cylinder provided with radial studs or pins for guarding a slot except as to the entrance of a proper key, which by its thrusting action will retire the thrust-catch from the block.

4. The combination, substantially as hereinbefore described, of a sliding spring-latch bolt, a pair of pivoted handles for retracting the bolt, each independently of the other, and a thumb-catch for confining the bolt against retraction by either of said handles.

ALBERT H. GLEASON.

Witnesses:
FRANK M. HETRICK,
JOHN D. WIDAMAN.